(12) United States Patent
Hajipetrou et al.

(10) Patent No.: US 11,054,810 B2
(45) Date of Patent: Jul. 6, 2021

(54) FREEZING SYSTEM FOR ELECTRONIC MOBILE DEVICE REPAIR

(71) Applicant: Mobile Advanced Technologies, LLC, Lewes, DE (US)

(72) Inventors: Georgios Christodouloy Hajipetrou, Pretoria (ZA); Hans Claussen, Berlin (DE); Charalampos Kalyvas, Greece (GR)

(73) Assignee: Mobile Advanced Technologies, LLC

( * ) Notice: Subject to any disclaimer, the term of this patent is extended or adjusted under 35 U.S.C. 154(b) by 0 days.

(21) Appl. No.: 17/013,490

(22) Filed: Sep. 4, 2020

(65) Prior Publication Data

US 2021/0072732 A1 Mar. 11, 2021

Related U.S. Application Data

(60) Provisional application No. 62/897,183, filed on Sep. 6, 2019.

(51) Int. Cl.
| | |
|---|---|
| *G05B 19/4155* | (2006.01) |
| *F25D 11/00* | (2006.01) |
| *H04Q 9/00* | (2006.01) |
| *H04L 29/08* | (2006.01) |

(52) U.S. Cl.
CPC ........ *G05B 19/4155* (2013.01); *F25D 11/006* (2013.01); *H04L 67/125* (2013.01); *H04Q 9/00* (2013.01); *G05B 2219/50333* (2013.01); *H04Q 2213/05* (2013.01)

(58) Field of Classification Search
CPC ...... G05B 19/4155; G05B 2219/50333; F25D 11/006; H04Q 9/00; H04Q 2213/05; H04L 67/125
See application file for complete search history.

(56) References Cited

U.S. PATENT DOCUMENTS

| | | | | | |
|---|---|---|---|---|---|
| 4,782,291 | A | * | 11/1988 | Blandin | G01R 31/2868 324/750.08 |
| 5,697,546 | A | * | 12/1997 | Cicioni | B60H 1/00321 228/183 |
| 6,279,325 | B1 | * | 8/2001 | Sekiya | F02G 1/043 62/520 |
| 2009/0301601 | A1 | * | 12/2009 | Enerson | C06D 5/06 141/38 |
| 2012/0118897 | A1 | * | 5/2012 | Davis | F25D 3/08 220/592.01 |
| 2016/0045841 | A1 | * | 2/2016 | Kaplan | B01D 3/06 429/49 |

* cited by examiner

*Primary Examiner* — Ziaul Karim
(74) *Attorney, Agent, or Firm* — Thorpe North & Western

(57) ABSTRACT

A system utilized for freezing parts of electronic mobile devices comprises a freezing machine incorporating internet communication hardware and software, molds and vacuum bags and a central computer server hosting and operating a web-centric and/or mobile app software application which connects to, updates and operates the freezing machine via the Internet. The freezing machine comprises a housing, an engine with cylindrical cooling head, an adjustable cooling head ring fixture and metal plate attached to the adjustable cooling head ring fixture. The freezing machine further comprises an encapsulation chamber, a lid, a power inlet, a LCD/OLED display and a PCB with processor capable of operating the freezing machine.

14 Claims, 19 Drawing Sheets

FIG. 1F
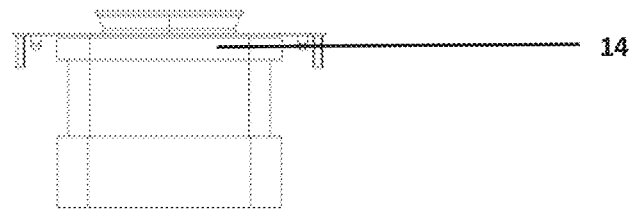
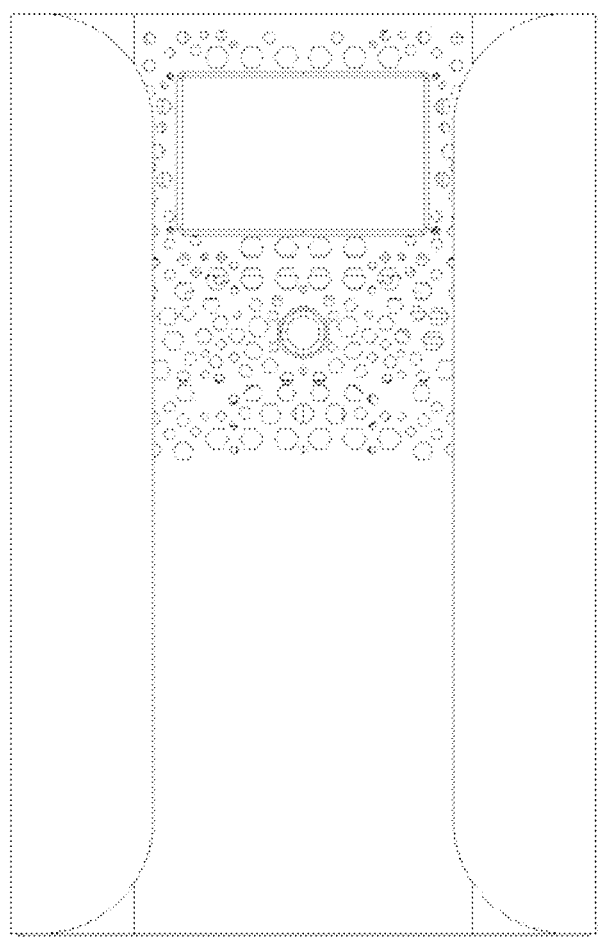

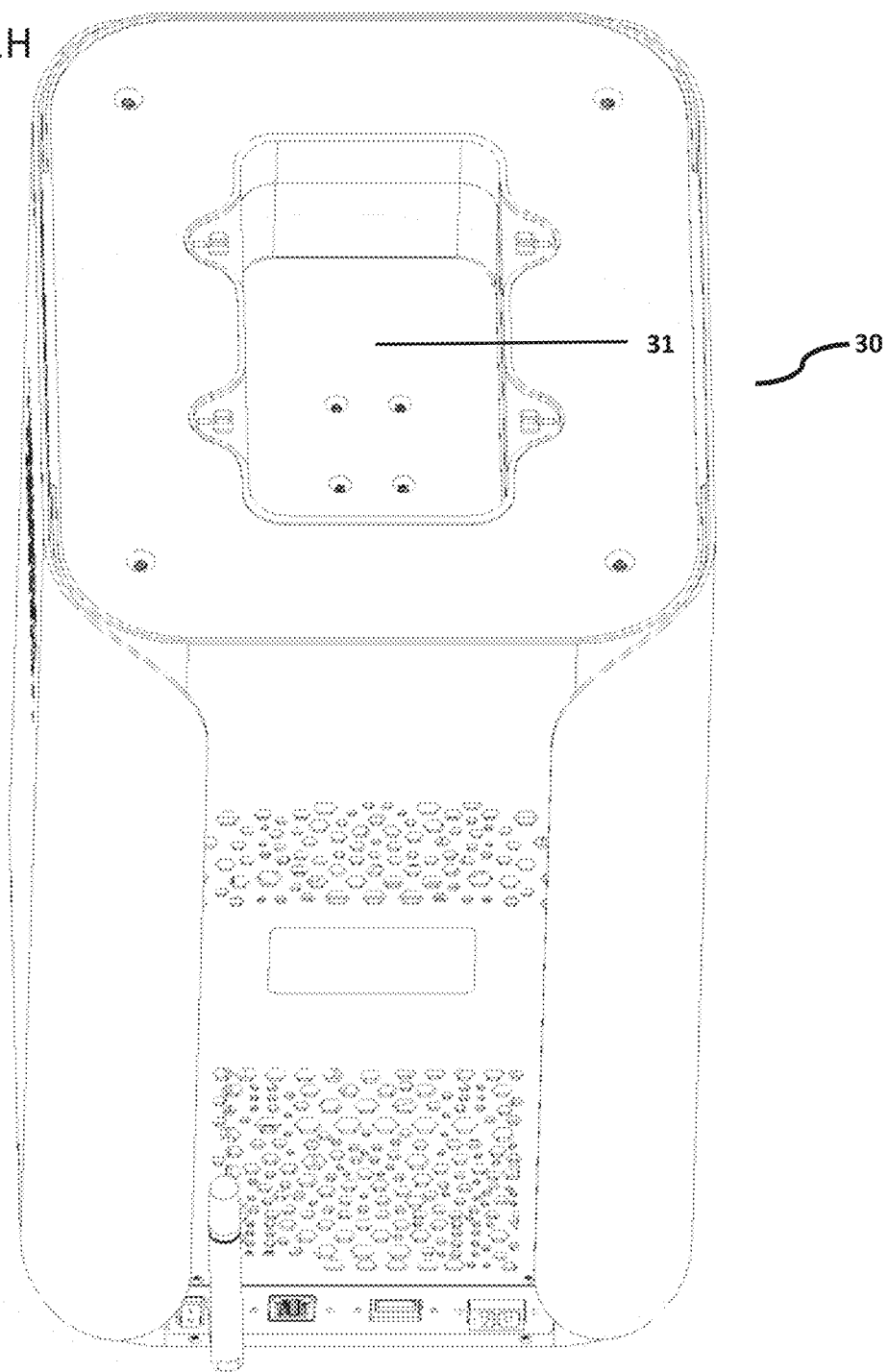

FIG. 21
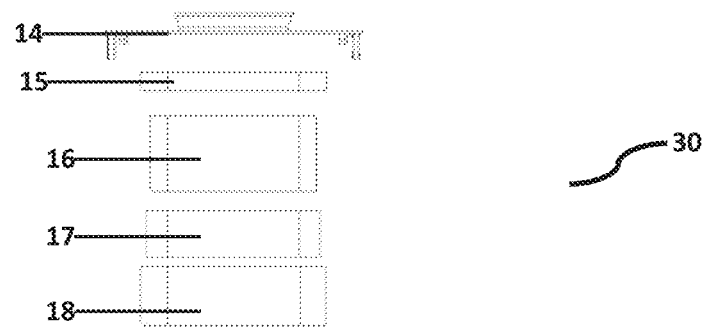
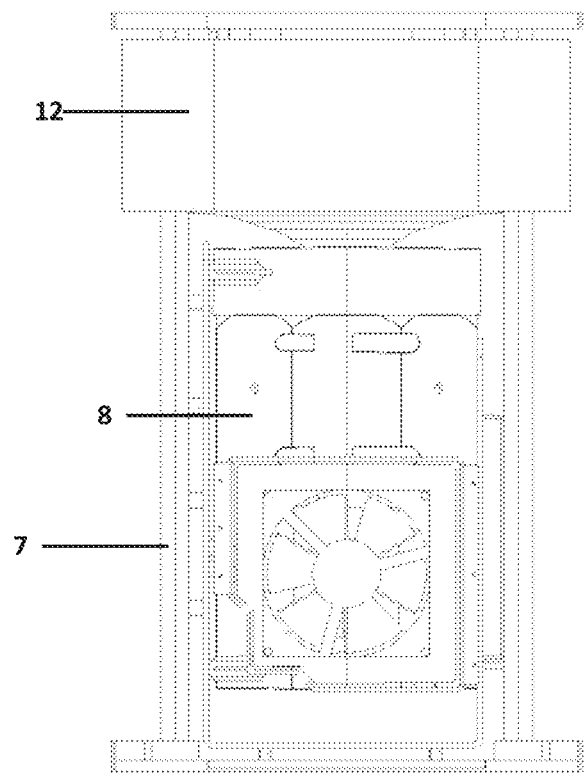

FREEZING SYSTEM FOR ELECTRONIC MOBILE DEVICE REPAIR

RELATED APPLICATION

This application claims the benefit of U.S. Provisional Application No. 62/897,183, filed on Sep. 6, 2019, the content of which is incorporated herein by reference.

BACKGROUND

Mobile electronic devices such as (but not limited to) tablets, mobile phones, mobile smart phones and gaming devices have become increasingly popular and also increasingly smaller. The various components and parts of such mobile electronic devices (displays, printed circuit boards, central processing units, "system on a chip", batteries, chipsets, antenna, modules, microphones, crystal oscillators, filters, rom memory, ram memory, power IC (integrated circuit), charging IC, logic IC, audio IC, microphones, camera lenses, sensors) have become and are becoming increasingly small and are assembled together in increasingly smaller form factors so that the mobile electronic device can have attractive and competitive features, specifications and dimensions. Furthermore the designers, engineers and producers of mobile electronic devices have resorted to combining the aforesaid components/parts into single unit components/parts.

In the event that a component/part of a mobile electronic device is damaged (either because the mobile electronic device was dropped, hit, submerged in water, overheated, etc., or either due to the component/part being defective or becoming damaged due to prolonged use) it is extremely difficult to isolate the damaged component/part for repair or replacement as many components/parts are stuck together with special bonding glue or material or are so tightly assembled and put together that conventional methods of isolation are not effective. This makes the repair or replacement of the damaged component/part in some cases impossible, resulting in the repair of the electronic mobile device only being possible if larger components containing the damaged component/part are replaced. This is extremely costly and sometimes the cost of same exceeds the value of the electronic mobile device resulting in the customer having to purchase a new mobile electronic device.

Freezers for freezing electronic mobile device screens for repair purposes are also known in the art. However these freezers have several shortcomings. For example, such freezers do not have internet communication hardware and software allowing them to connect to a central server via the internet facilitating the sending and receiving of instructions and data to and from the freezer and a central server; the freezers cannot, on a remote basis, receive instructions, data and freezing parameters (temperatures, timing) specific to a particular mobile device screen from a central server via the internet (on site physical instruction and data input and updates are required); the freezers have software and freezing parameters which cannot be updated remotely via the internet (on site physical updates are required); the freezers cannot reach low enough temperatures needed for efficient freezing resulting in poor performance; the freezers are very large, taking up as much space as a large chest freezer; the freezers are unsafe as the freezers use ammonia or nitrogen or other dangerous substances to reach freezing temperatures; the freezers consume large amounts of power; and the freezers have to be kept running all day.

SUMMARY

A system is provided comprising a central freezing machine which also incorporates internet communication hardware and software, molds and vacuum bags and a central computer server hosting and operating a web-centric and/or mobile app software application which connects to the central freezing machine via the internet. The system:

A. is small enough to be placed on a small bench or desk requiring very little space to operate;
B. consumes very small amounts of power;
C. reaches extremely low sub-zero temperatures;
D. does not need to be kept running all day and can reach extremely low sub-zero temperatures fast and with low power consumption;
E. can efficiently freeze and isolate the aforesaid electronic mobile device components/parts so that the components/parts can be repaired or replaced resulting in a successful and cost-efficient repair of the electronic mobile device;
F. performs real time remote sending and receiving of instructions, freezing parameters (temperature, time) and data specific to a particular mobile device and/or mobile device component/part to and from the central freezing machine and the central server via the internet;
G. performs real time sending and receiving of data between the central freezing machine and the central server via the internet facilitating updates to the software of the central freezing machine so as to accommodate the efficient and correct freezing of new electronic mobile device components/parts, to rectify operating defects of the central freezing machine, to improve the central freezing machine efficiency and functionality as well as to add additional central freezing machine functionality; and
H. includes a real time web-centric or mobile app based software platform and database allowing remote control of the central freezing machine as well as remote access to real time and historic repair and central freezing machine operating related data.

In one aspect of the technology, a system for freezing components/parts of electronic mobile devices so that the components/parts can be isolated and repaired or replaced, is disclosed.

The system comprises a central freezing machine incorporating internet communication hardware and software, molds and vacuum bags with specific dimensions for various models of electronic mobile devices and a central computer server hosting a web-centric and/or mobile app software application which connects to, communicates with, exchanges data, updates software and operates the central freezing machine via the Internet and also provides real time and historical operational data of the central freezing machine.

In one aspect, the central freezing machine is comprised of six panels which are held together by four internal metal columns and screws forming the central freezing machine housing. In one aspect the central freezing machine contains one or more of the following components and features. In one aspect the central freezing machine contains a Stirling engine which is utilized to generate sub-zero temperatures and which is mounted on the bottom base panel of the central freezing machine housing in a manner in which the Stirling engine faces in an upwards direction. In one aspect the Stirling engine has a top end cylindrical cooling head which reaches sub-zero temperatures when the Stirling engine is in operation. In one aspect an adjustable cooling head ring fixture is affixed around the cylindrical cooling head and attached to such adjustable cooling head ring fixture is a metal plate so that the sub-zero temperatures of the cylindrical cooling head are transferred to the adjustable cooling head ring fixture and to the metal plate resulting in the metal plate reaching sub-zero temperatures and operating as a base upon which the electronic mobile device components/parts are placed in order to be frozen.

In one aspect the central freezing machine further comprises an encapsulation chamber made of a combination of polyurethane and expanded polypropylene material and parts which encapsulates the cylindrical cooling head, the adjustable cooling head ring fixture and the metal plate for temperature and air insulation purposes and also to form a freezing chamber with the metal plate being the base of the chamber. In one aspect, screwed at the top of the freezing chamber is the top central freezing machine housing panel.

In one aspect the freezing chamber is sealed by a push down lid comprised of a metal top layer and subsequent layers of polyurethane sponge and expanded polypropylene so that when the push down lid is pushed into the freezing chamber the push down lid has a spring sponge effect allowing the push down lid to press gently and firmly on the electronic mobile device part which has been placed in the freezing chamber and on to the metal plate. In one aspect there are 4 clips on the metal top layer of the lid which allow the lid to close when pushed down, and when pushed down again to pop open.

In one aspect, a screw down adjustable lever system is found just above the metal plate and is utilized to keep the electronic mobile device part firmly pressed against the metal base so as to lessen the freezing period, ensure uniform freezing and also to maximize the freezing efficiency.

The central freezing machine also comprises a control printed circuit board with processor and operating system software capable of operating the central machine as well as establishing a two way data communications connection with the central computer server via a two-way data Internet connection obtained and provided through a communications printed circuit board and Wi-Fi aerial and/or Ethernet port housed within the central freezing machine. In one aspect, the central freezing machine unit may also comprise a LCD display (liquid crystal display) or OLED display (organic light-emitting diode) display for operation control and display purposes.

In one aspect the central freezing machine contains a power inlet found at the bottom back base of the central freezing machine and which serves the purpose of distributing power to the various components of the central freezing machine, namely the Stirling engine, the control PCB (printed circuit board) and the communications PCB. In one aspect a mechanical on/off switch is also found at the bottom back base of the central freezing machine and is utilized to power the central machine unit in an on or off power position.

In one aspect the system may also contain a central computer server hosting and operating a web-centric and/or a mobile app software application used for remotely operating the central freezing machine via the Internet and/or remotely updating the central freezing machine software and settings via the Internet and also for providing real time and historical central freezing machine operating data to the user of the system whereby the owner of one or multiple central freezing machines can either remotely update one or more central freezing machine software and settings and/or remotely control the operation of one or more central freezing machines and/or remotely activate and de-activate one or more central freezing machines and/or have immediate remote access to real time or historical statistical information related to the repairs done by such machines, repairs per electronic mobile device model, repairs per technician, repairs per time period, repairs per location, repairs per grouped electronic mobile device models, technicians, time periods and locations, repair success rates, repair times, electronic mobile device models repaired, technician identity, defects of the machine, wrong machine settings, user identified machine defaults, consumables and parts required and being able to order such consumables and parts immediately via the web-centric and/or a mobile app software application.

BRIEF DESCRIPTION OF THE DRAWINGS

FIG. 1F is a front view of the central freezing machine specifically showing the front, left side and right side panels, the LCD or OLED display, the operation button, and the top lid in a suspended state above the central freezing machine.

FIG. 1H is a back top view of the central freezing machine showing the back, left side and right side panels, the ON/OFF power switch, the antenna, the Ethernet inlet port, the USB inlet port, the power inlet, the freezing chamber and the top panel.

FIG. 2I is a side view of the bottom panel, the metal columns, the Stirling engine, the encapsulation chamber and the push down lid comprised of a metal top layer and subsequent layers of polyurethane sponge and expanded polypropylene.

DETAILED DECRIPTION

Figure 1A:
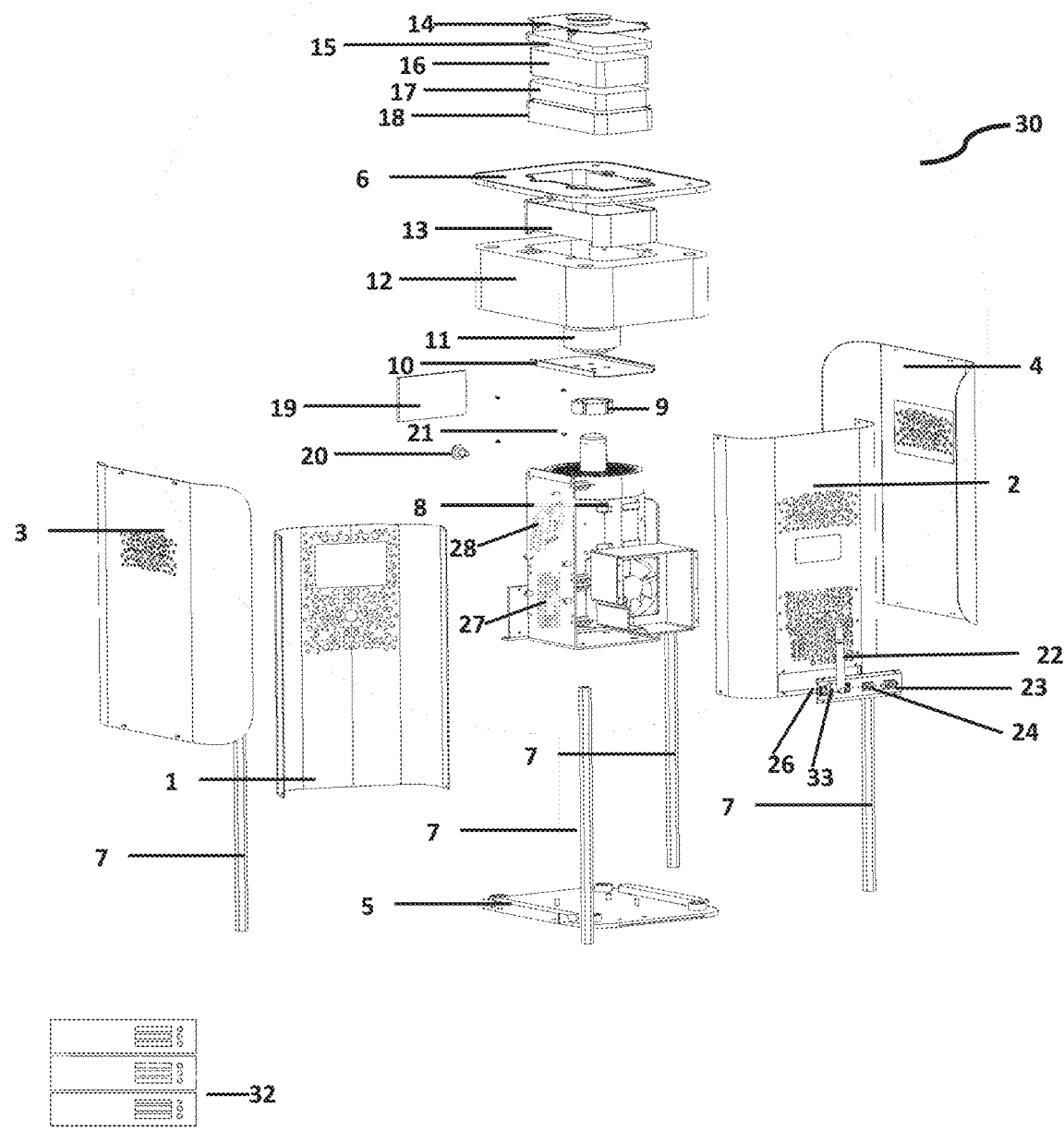
FIG. 1A is a view of the central freezing machine with one or more aspects of the technology.

The technology may be best understood by reference to the following description taken in conjunction with the accompanying representations.

Turning now to FIGS. 1A through 1H, various views of the central freezing machine 30 in accordance with one or more aspects of the present technology are shown. A back housing panel 2, a front housing panel 1, a bottom housing panel 5, a left side panel 3, a right side panel 4 and a top housing panel 6 are shown. The four corners of the top housing panel 6 are screwed onto the top end of four steel columns 7, whilst the bottom end of the four steel columns 7 is screwed onto the four corners of the bottom housing panel 5. The front housing panel 1, the back housing panel 2, the side left panel 3, the right side panel 4 are then clipped or screwed onto the 4 steel columns 7 resulting in the formation of the housing of the central freezing machine.

Within the housing of the central freezing machine 30, a Stirling engine system complete with built in PCB, power supply unit and cooling fan 8 is also shown which is mounted and screwed to the bottom housing panel 5. The Stirling engine system 8 is mounted and screwed to the bottom housing panel 5 in a manner in which the Stirling engine faces in an upwards direction. The Stirling engine system 8 is utilized to generate sub-zero temperatures which may even exceed negative 100 degrees Celsius. The Stirling engine system 8 has a top end cylindrical cooling head which reaches sub-zero temperatures which may even exceed negative 150 degrees Celsius and which vary depending on the voltage and current directed to the Stirling engine system 8. An adjustable cooling head ring fixture 9 is affixed around the Stirling engine 8 cylindrical cooling head and attached to such adjustable cooling head ring fixture 9 is a metal plate 10 so that the sub-zero temperatures of the Stirling engine 8 cylindrical cooling head are transferred to the adjustable cooling head ring fixture 9 and to the metal plate 10 resulting in the metal plate 10 reaching sub-zero temperatures and operating as a base upon which the electronic mobile device components/parts are placed in order to be frozen. Persons having skill in the art will realize that the adjustable cooling head ring fixture 9 and the metal plate 10 can be made out of copper and/or aluminum or any other metal or material which can be deemed to be the best option for strength and temperature transfer from the Stirling engine 8 top end cylindrical cooling head to the adjustable cooling head ring fixture 9 and to the metal plate 10.

An encapsulation chamber 12 is also shown. The encapsulation chamber 12 is comprised of a combination of polyurethane and expanded polypropylene material and parts which are necessary to maintain air and temperature insulation efficiency and strength. Furthermore the encapsulation chamber 12 also comprises internal polyurethane and expanded polypropylene parts 11 which also give strength and maximize vibration absorption. Persons having skill in the art will realize that the material utilized for the composition of the encapsulation chamber 12 may vary depending on temperature, air, vibration absorption and strength requirements. The encapsulation chamber 12 encapsulates the Stirling engine 8 top end cylindrical cooling head, the adjustable cooling head ring fixture 9 and the metal plate 10 for temperature and air insulation purposes and for strength and vibration purposes and also to form a freezing chamber 31 with the metal plate 10 being the base of the freezing chamber 31. The freezing chamber 31 walls are further lined and strengthened by the freezing chamber wall perimeter 13.

A push down lid 14 is also shown. The push down lid 14 is comprised of 5 layers, namely the top push down lid aluminum layer 14, the second expanded polypropylene layer 15 for strength purposes, the third sponge polyurethane layer 16 for a sponge spring effect, the fourth polyurethane layer 17 for structural effect and the fifth expanded polypropylene layer 18 for strength effect. The overall functioning of the push down lid 14 is not only to seal the freezing chamber but also to have a sponge spring open and close feature allowing the push down lid 14 to press gently and firmly on the electronic mobile device part which has been placed in the freezing chamber 31 and on to the metal plate 10. Furthermore four push down clips are found on the top push down lid 14 layer which allow the push down lid 14 to close when pushed down, and when pushed down again to pop open. Persons having skill in the art will realize that number of layers and material utilized for the composition of the push down lid 14 as well as the quantity of push down clips may vary depending on temperature, air, vibration absorption and strength requirements.

A control PCB (printed circuit board) 27 is also shown. Persons having skill in the art will realize that the control PCB 27 can be situated in different areas within the central freezing machine 30. The control PCB 27 has a processor and software which make the control PCB 27 capable of operating the central freezing machine 30 and the Stirling engine system 8 and also at variable user required temperatures. The control PCB 27 is also capable of establishing and performing two-way Internet data communication with the central computer server 32 (which hosts and operates a web-centric and/or mobile app software application) obtained and provided through a communications PCB 28 facilitating real time, remote sending and receiving of operating and process instructions, freezing parameters (temperature, time) and data specific to a particular mobile device and/or mobile device component/part. The Internet two-way data communication between the control PCB 27 and the central computer server 32 (which hosts and operates a web-centric and/or mobile app software application) facilitates and enables the transmission by a user of the web-centric and/or mobile app software application hosted on the central computer server 32 of operating and process instructions and data specific to a particular mobile device and/or mobile device component/part to the control PCB 27 in order to control the operations of the central freezing machine 30 and Stirling engine system 8 as well as facilitating updates to the software of the central freezing machine 30 so as to accommodate the efficient and correct freezing of new electronic mobile device components/parts, to rectify operating defects of the central freezing machine 30, to improve the central freezing machine 30 efficiency and functionality as well as to add additional central freezing machine 30 functionality. The Internet two-way data connection between the control PCB 27 and central computer server 32 which hosts and operates a web-centric and/or mobile app software application also empowers the owner of one or multiple central freezing machines 30 to remotely update one or more central freezing machine 30 software and settings and/or remotely control the operation of one or more central freezing machines 30 and/or remotely activate and de-activate one or more central freezing machines 30 and/or have immediate remote access to real time or historical statistical information related to the repairs done by such machines, repairs per electronic mobile device model, repairs per technician, repairs per time period, repairs per location, repairs per grouped electronic mobile device models, technicians, time periods and locations, repair success rates, repair times, electronic mobile device models repaired, technician identity, defects of the central freezing machine 30, wrong central freezing machine 30 settings, user identified central freezing machine 30 defects, consumables and parts required and being able to order such consumables and parts immediately via the web-centric and/or a mobile app software application.

A communications PCB (printed circuit board) 28 is also shown. Persons having skill in the art will realize that the communications PCB 28 can be situated in different areas within the central freezing machine 30. The communications PCB 28 has an internal processor and modem which make the communications PCB 28 capable of connecting to the Internet and transfer data and commands to and from the control PCB 27 and the central computer server 32 via the Internet. The communications PCB 28 gains access to the Internet via a wireless antenna 22 located on the bottom of the back panel 2 or from an Ethernet inlet port 25 also located on the bottom of the back panel 2. Connection between the communications PCB 28 and a wireless Wi-Fi network is made possible via the wireless antenna and a WPS (Wi-Fi Protected Setup) push button 33 as well as by entering the wifi network password on the LCD/OLED display 19.

A LCD/OLED display is also shown 19. The LCD/OLED display 19 is capable of displaying various operational information of the central freezing machine 30 to the user of the central machine 30. The LCD/OLED display 19 also has touch control allowing the user of the central freezing machine 30 to input commands, change settings, perform software updates, connect the central freezing machine 30 to wireless networks and in general to operate the central freezing machine 30.

A power inlet 23 is also shown. The power inlet 23 is located on the bottom of the back panel 2 and provides electrical power to the control PCB 27, the communications PCB 28, the Stirling engine system 8 and the LCD/OLED display 19. An ON/OFF switch 26 is also located on the bottom of the back panel 2 and is utilized to power the central freezing machine 30 in an on or off power position. An operations button 20 located on the front panel 1 underneath the LCD/OLED display 19 is also shown. The operations button 20 is capable of making the central freezing machine 30 to perform various defined operations.

Figure 1B:
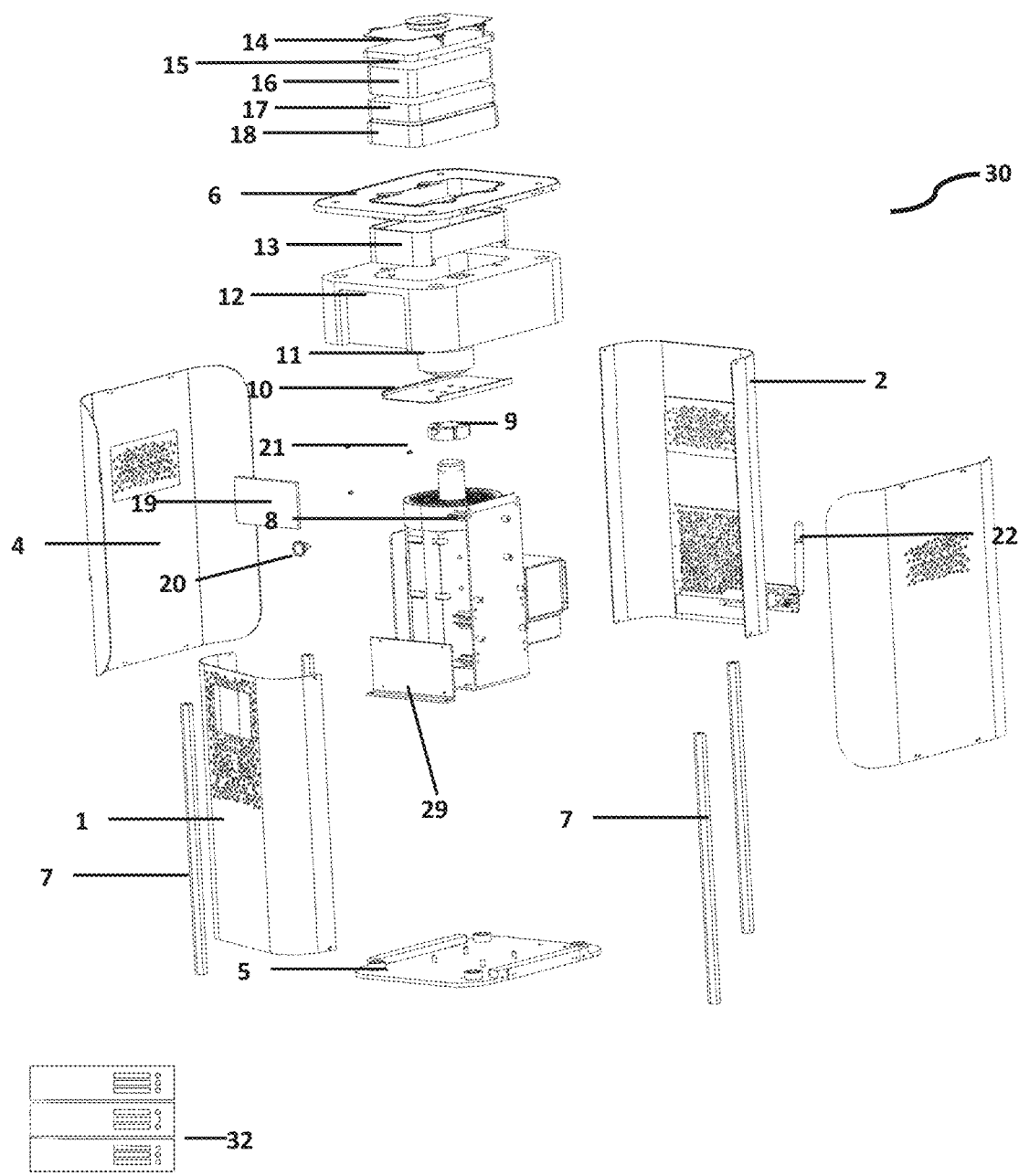
FIG. 1B is an alternate view of the central freezing machine showing one or more aspects of the technology.
Figure 1C:
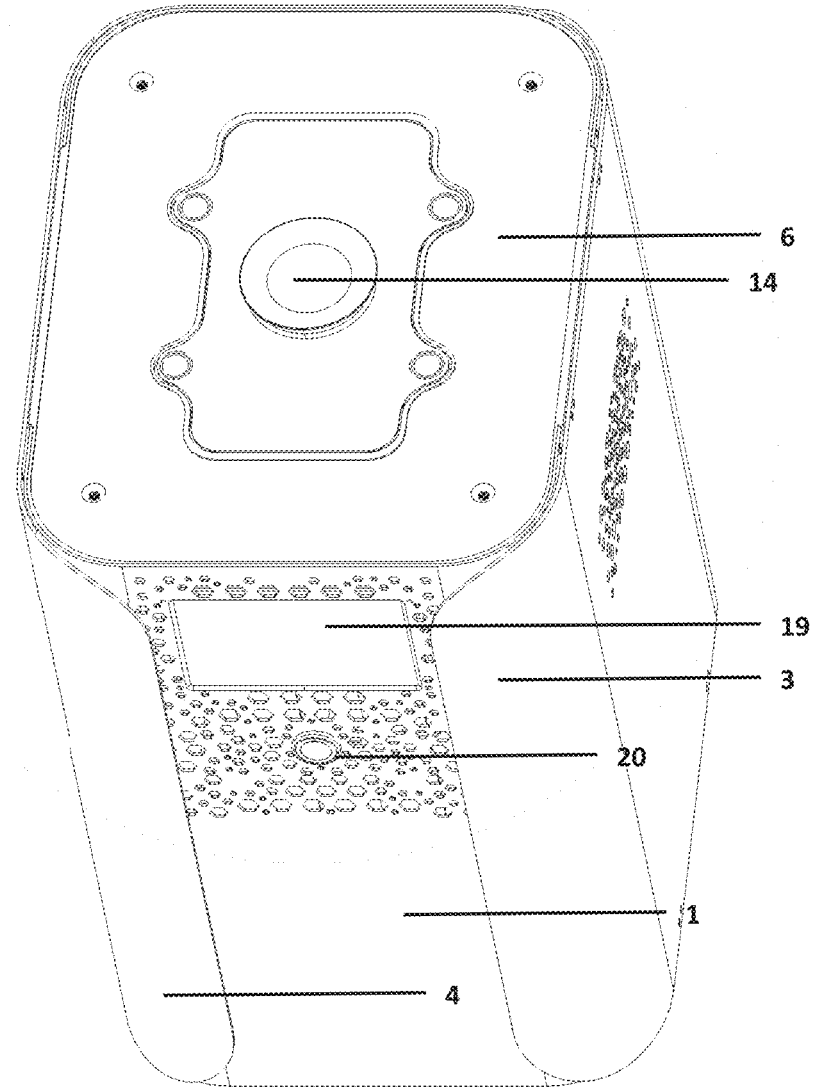
FIG. 1C is a top front view of the central freezing machine showing the top lid, the front panel with LCD or OLED display and operation button as well as the top panel and left side panel.
Figure 1D:
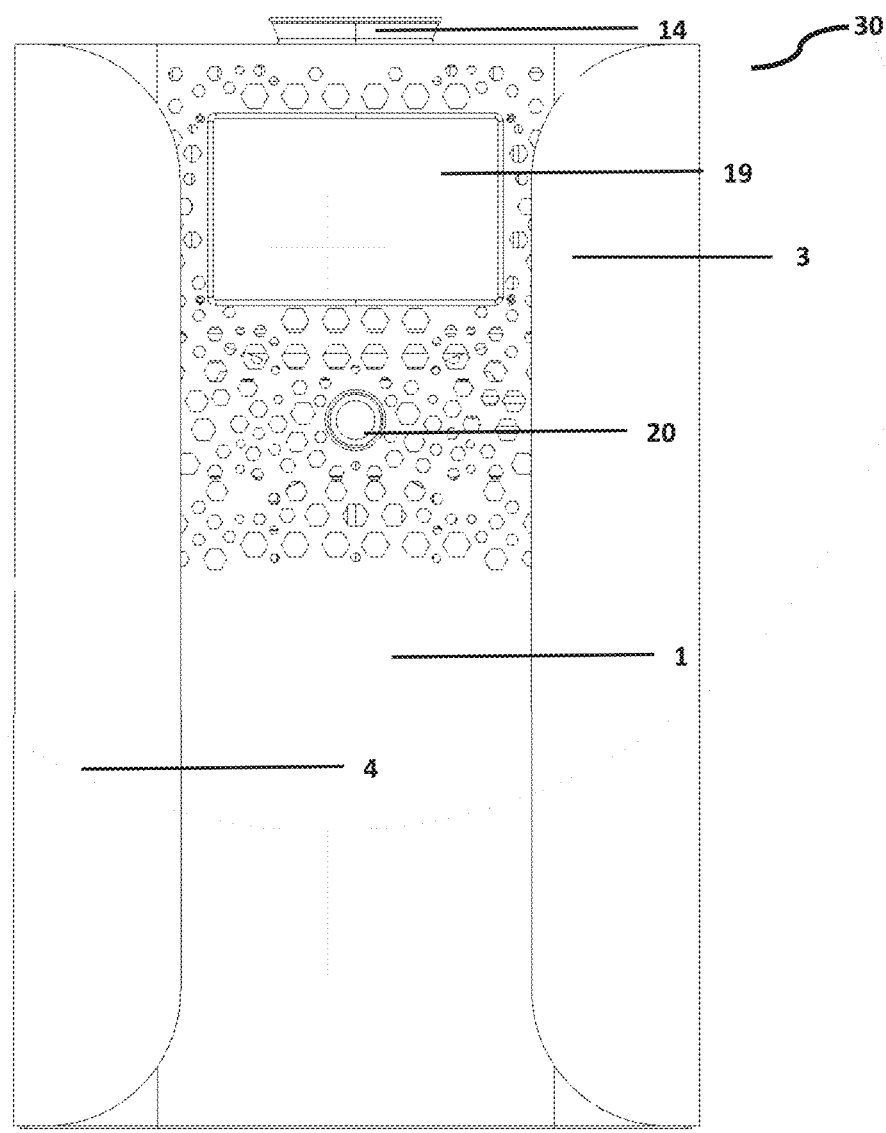
FIG. 1D is a front view of the central freezing machine specifically showing the front, left side and right side panels, the LCD or OLED display, the operation button and the handle of the top lid.
Figure 1E:
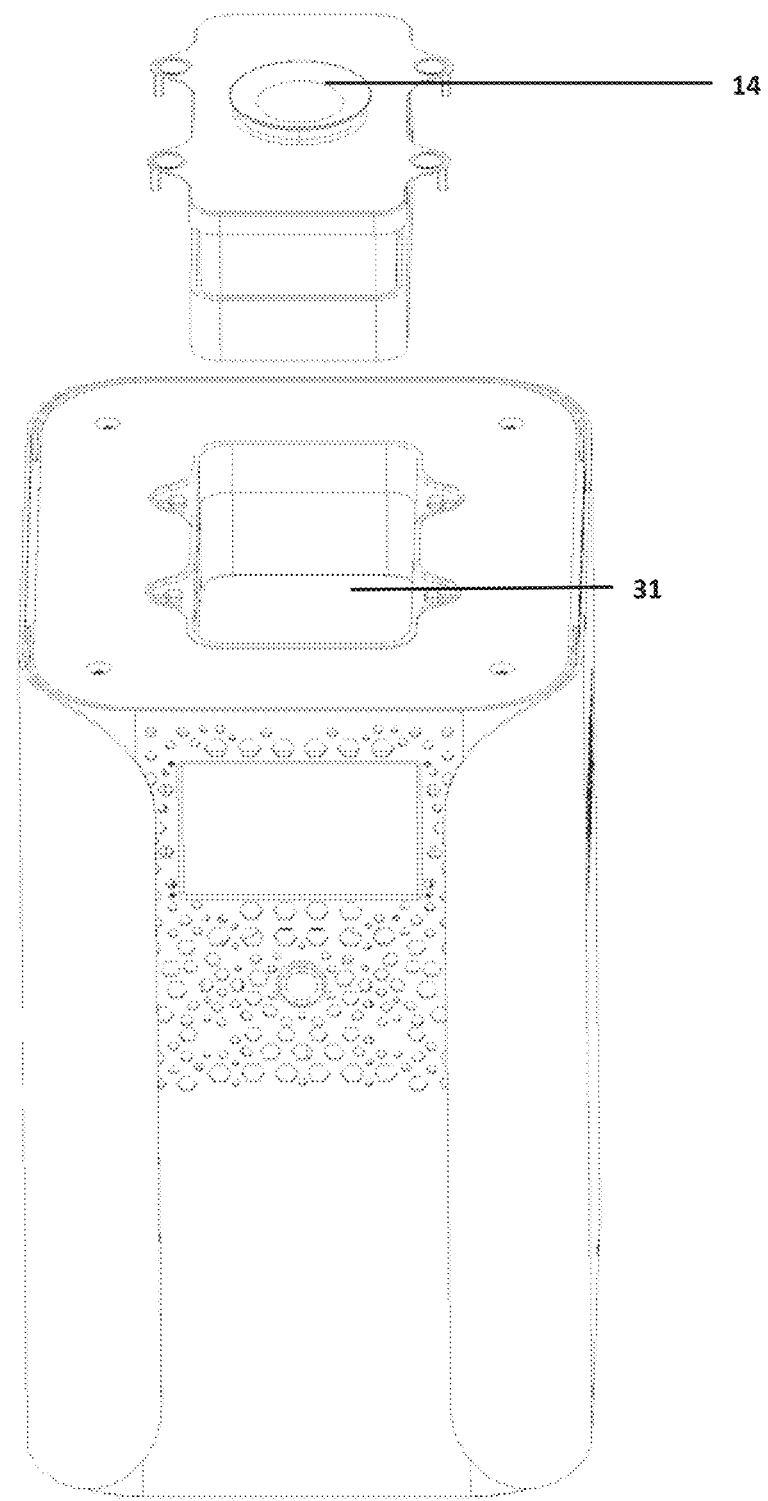
FIG. 1E is a front top view of the central freezing machine specifically showing the front, left side and right side panels, the LCD or OLED display, the operation button, the top panel, the freezing chamber and the top lid in a suspended state showing how the top lid lifts out of the freezing chamber.
Figure 1G:
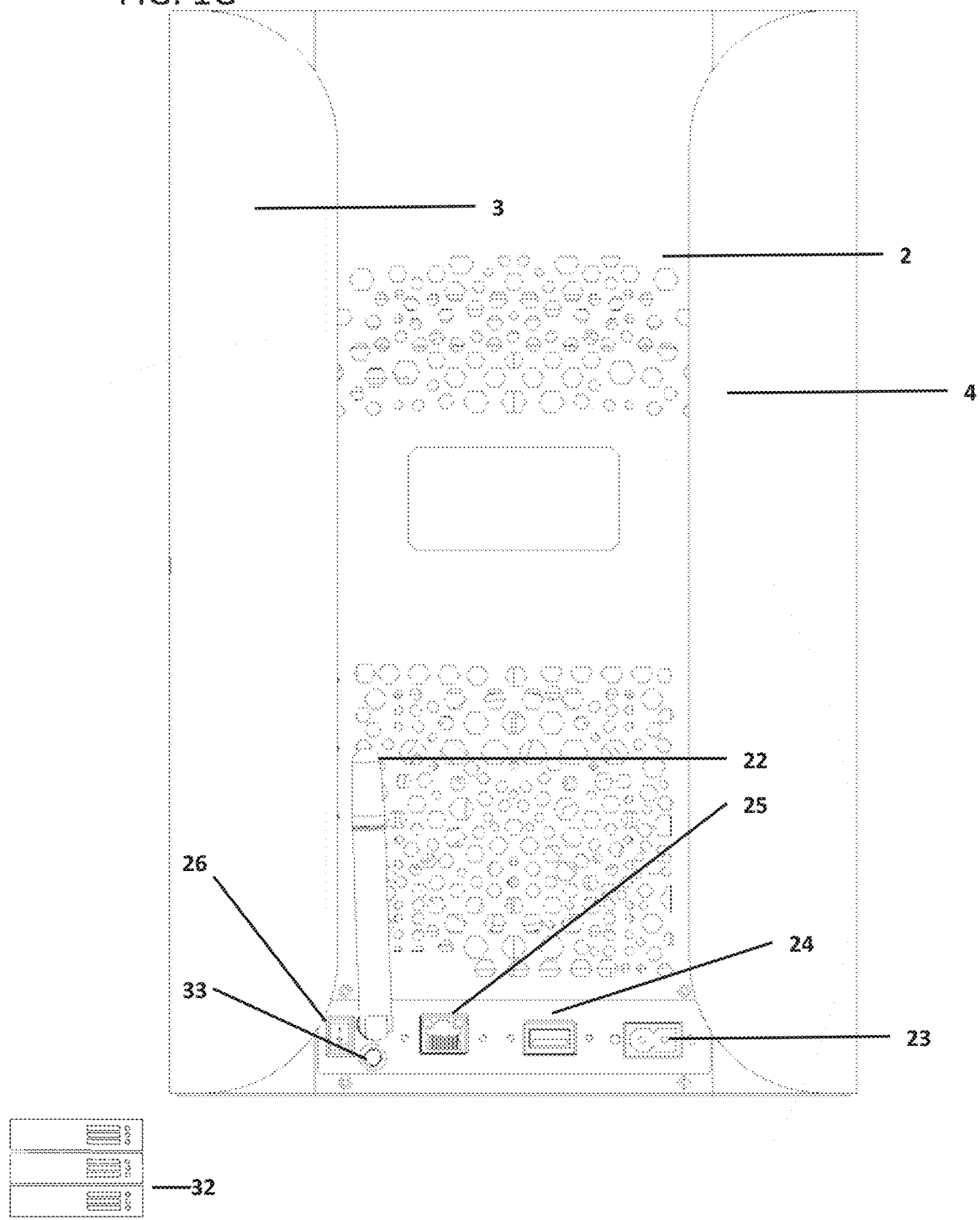
FIG. 1G is a back view of the central freezing machine showing the back, left side and right side panels, the ON/OFF power switch, the antenna, the WPS (Wi-Fi Protected Setup) switch, the Ethernet inlet port, the USB (universal serial bus) inlet port and the power inlet.
Figure 2A:
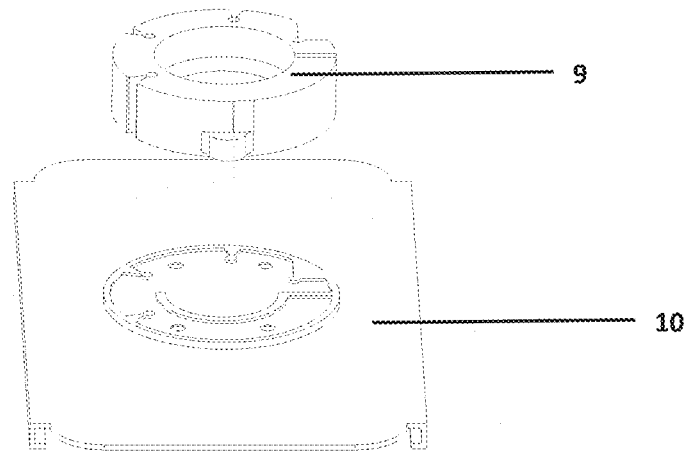
FIG. 2A is a top view of the adjustable cooling head ring fixture and the metal plate.
Figure 2B:
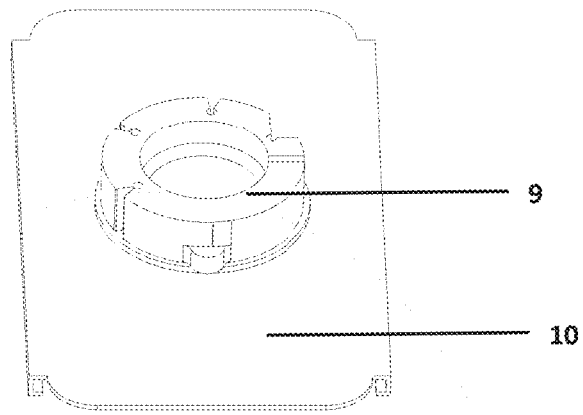
FIG. 2B is a top view of the adjustable cooling head ring fixture and the metal plate specifically showing how the adjustable cooling head ring fixture and the metal plate are attached together.
Figure 2C:
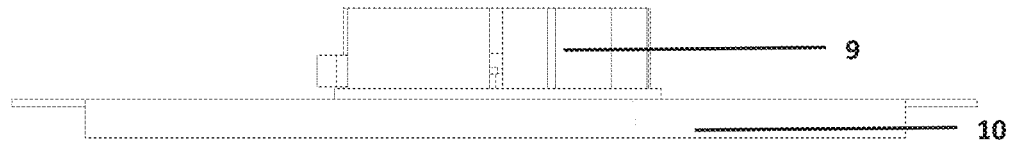
FIG. 2C is a side view of the adjustable cooling head ring fixture and the metal plate when the adjustable cooling head ring fixture and the metal plate are attached together.
Figure 2D:
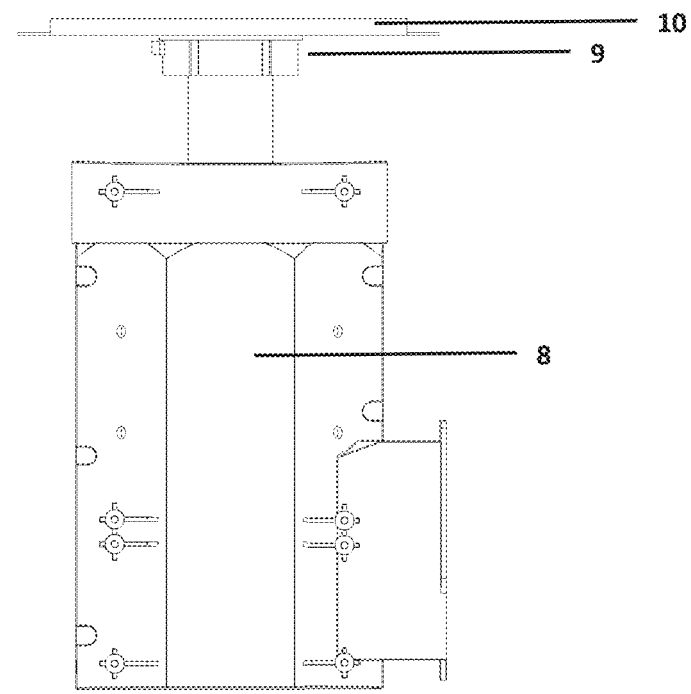
FIG. 2D is a side view of the Stirling engine, the Stirling engine top end cylindrical cooling head and the cooling head ring fixture and metal plate attached together and affixed to the Stirling engine top end cylindrical cooling head.
Figure 2E:
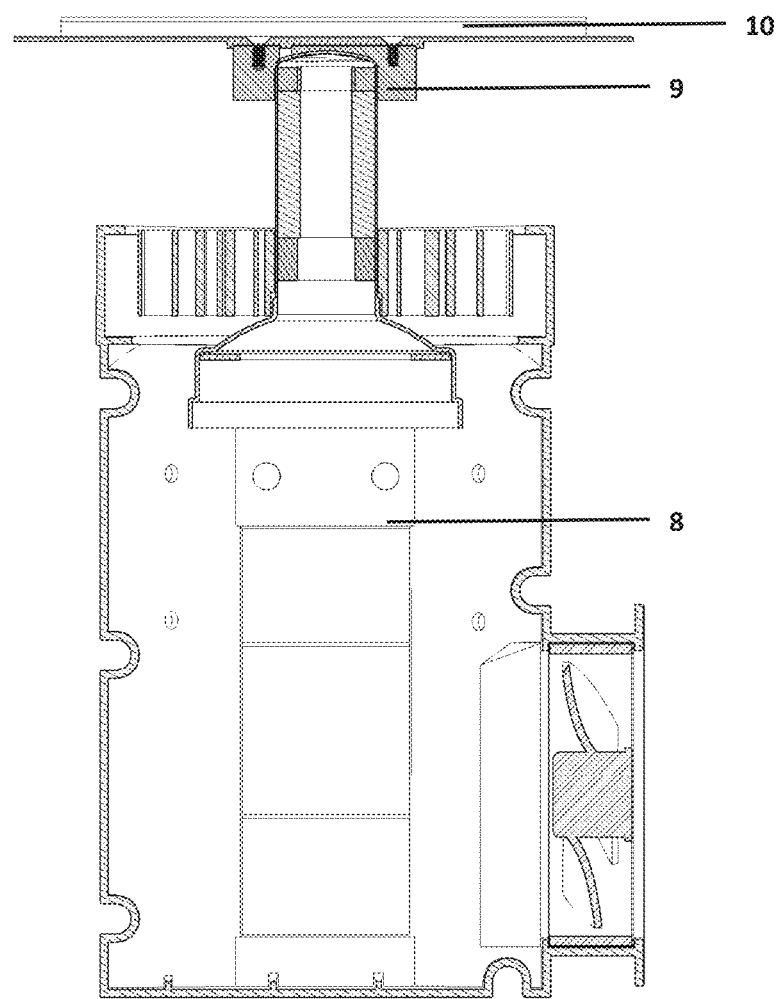
FIG. 2E is a side view of the Stirling engine, the Stirling engine top end cylindrical cooling head and the cooling head ring fixture and metal plate attached together and affixed to the Stirling engine top end cylindrical cooling head.
Figure 2F:
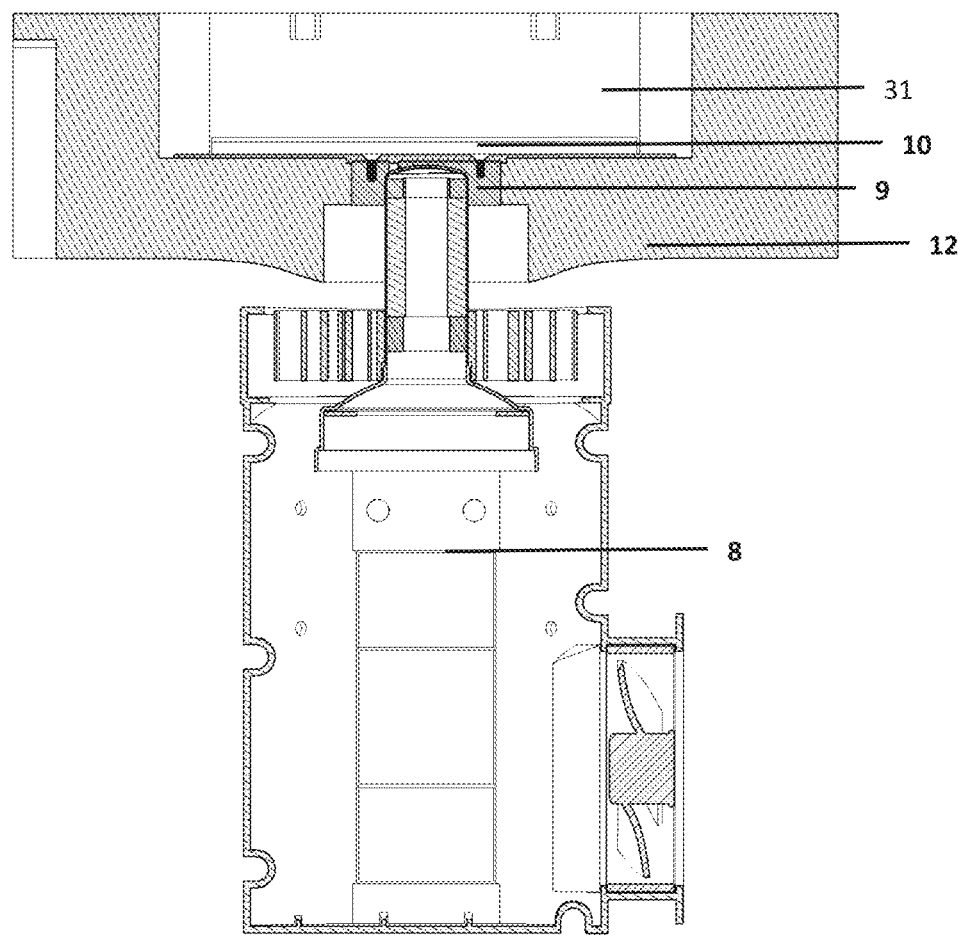
FIG. 2F is a side view of the Stirling engine, the Stirling engine top end cylindrical cooling head and the cooling head ring fixture and metal plate attached together and affixed to the Stirling engine top end cylindrical cooling head and specifically shows how the encapsulation chamber made of a combination of polyurethane and expanded polypropylene material and parts encapsulates the cylindrical cooling head, the adjustable cooling head ring fixture and the metal plate for temperature and air insulation purposes and also to form a freezing chamber.
Figure 2G:
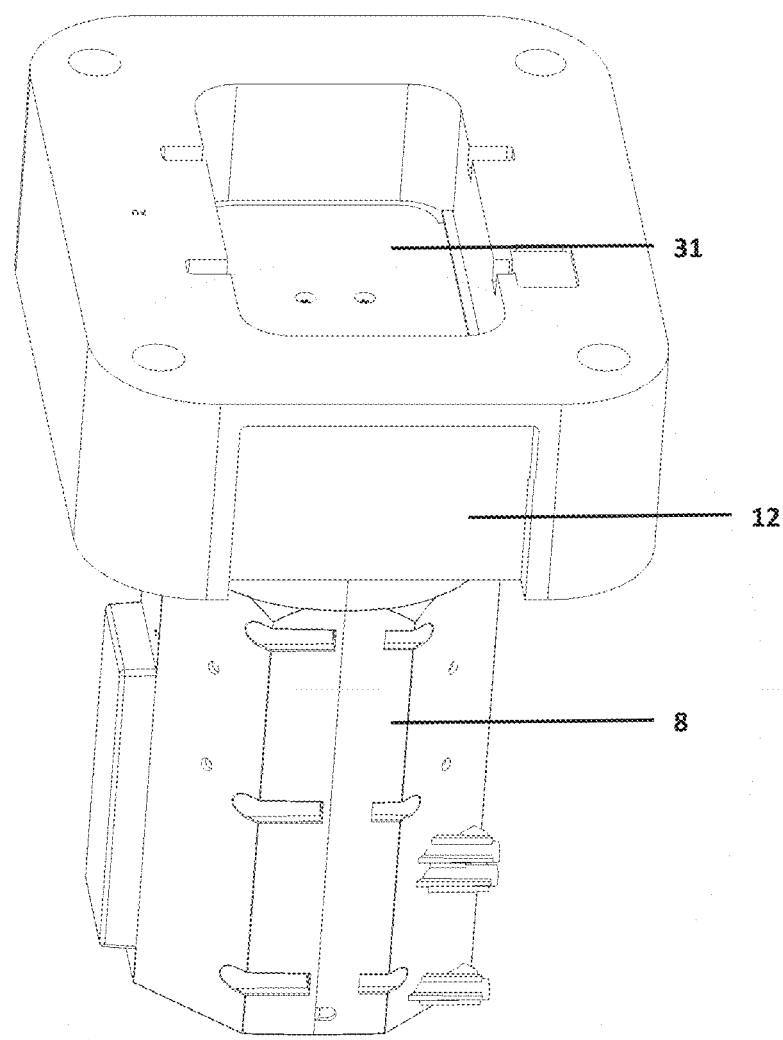
FIG. 2G is a top side view of the freezing chamber, the encapsulation chamber and the Stirling engine.
Figure 2H:
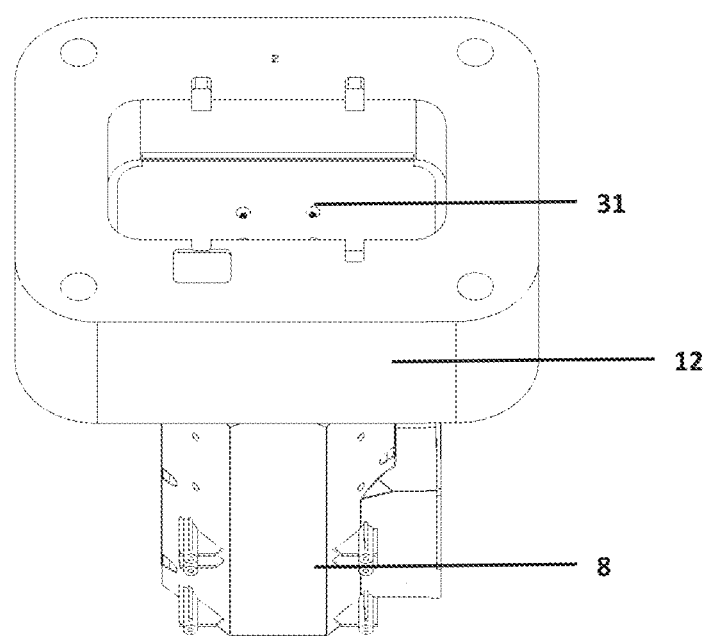
FIG. 2H is an alternate top side view of the freezing chamber, the encapsulation chamber and the Stirling engine.

Turning now to FIG. 2A the adjustable cooling head ring fixture 9 and the metal plate 10 shown in FIGS. 1A and 1B are shown. The adjustable cooling head ring fixture has four holes on a perimeter which match the exact location of four holes on the metal plate 10. Now turning to FIG. 2B and FIG. 2C the adjustable cooling head ring fixture 9 and the metal plate 10 attached to each other are shown. Turning now to FIG. 2D and FIG. 2E the adjustable cooling head ring fixture 9, the Stirling engine 8 cylindrical cooling head, the metal plate 10 and the Stirling engine 8 with cylindrical cooling head shown in FIGS. 1A and 1B are also shown. The adjustable cooling head ring fixture 9 is affixed around the Stirling engine 8 cylindrical cooling head and attached to such adjustable cooling head ring fixture 9 is the metal plate 10 so that the sub-zero temperatures of the Stirling engine 8 cylindrical cooling head are transferred to the adjustable cooling head ring fixture 9 and to the metal plate 10 resulting in the metal plate 10 reaching sub-zero temperatures and operating as a base upon which the electronic mobile device components/parts are placed in order to be frozen.

Turning now to FIG. 2F-2I, the Stirling engine 8 with cylindrical cooling head, the adjustable cooling head ring fixture 9, the metal plate 10, the encapsulation chamber 12, the freezing chamber 31, the top housing panel 6, the bottom housing panel 5, the steel columns 7 and the push down lid 14 with 5 layers 15, 16, 17, 18 are also shown. FIGS. 2F-2I clearly show how the adjustable cooling head ring fixture 9 is affixed around the Stirling engine 8 cylindrical cooling head and attached to such adjustable cooling head ring fixture 9 is the metal plate 10 so that the sub-zero temperatures of the Stirling engine 8 cylindrical cooling head are transferred to the adjustable cooling head ring fixture 9 and to the metal plate 10 resulting in the metal plate 10 reaching sub-zero temperatures and operating as a base upon which the electronic mobile device components/parts are placed in order to be frozen. FIGS. 2F-2I also clearly show how the encapsulation chamber 12 encapsulates the Stirling engine 8 top end cylindrical cooling head, the adjustable cooling head ring fixture 9 and the metal plate 10 for temperature and air insulation purposes and for strength and vibration purposes and also to form a freezing chamber 31 with the metal plate 10 being the base of the freezing chamber 31.

Figure 3A:
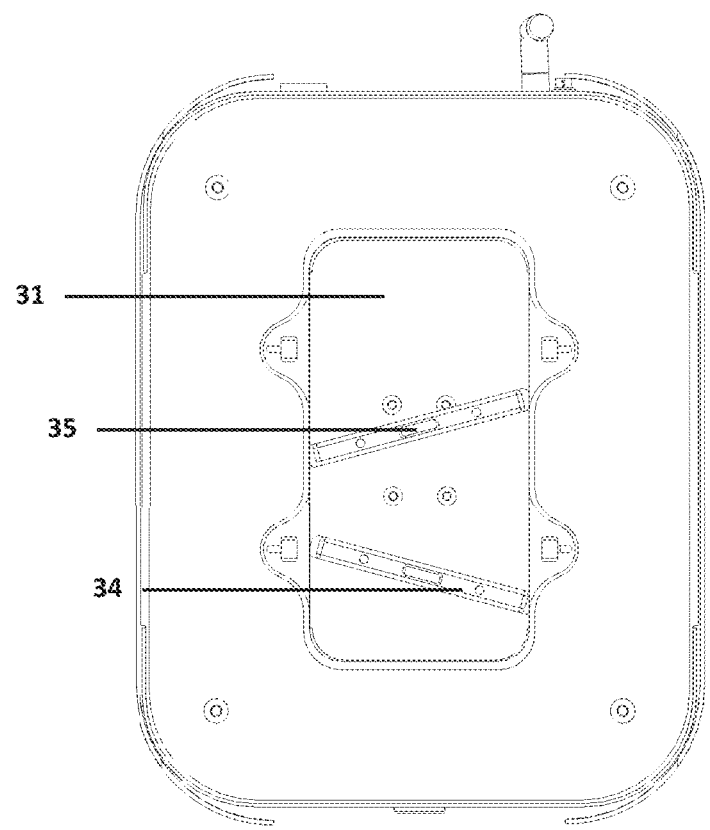
FIG. 3A is a top view showing the freezing chamber, the metal plate, the top panel, the 4 screws which attach the metal plate to the adjustable cooling head ring fixture, the left, right, back and front panels, the antenna and two adjustable lever systems.
Figure 3B:
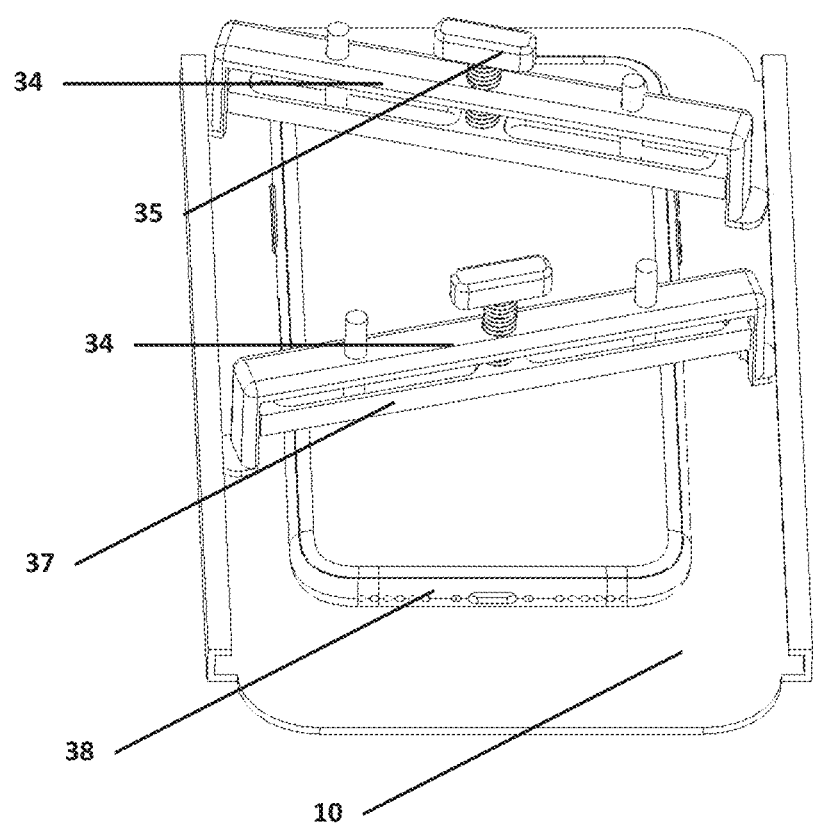
FIG. 3B is a top angled view showing the metal plate, the two adjustable lever systems and how the two adjustable lever systems are inserted on the metal plate and a mobile phone which is being pressed on to the metal plate by the two adjustable lever systems.
Figure 3C:
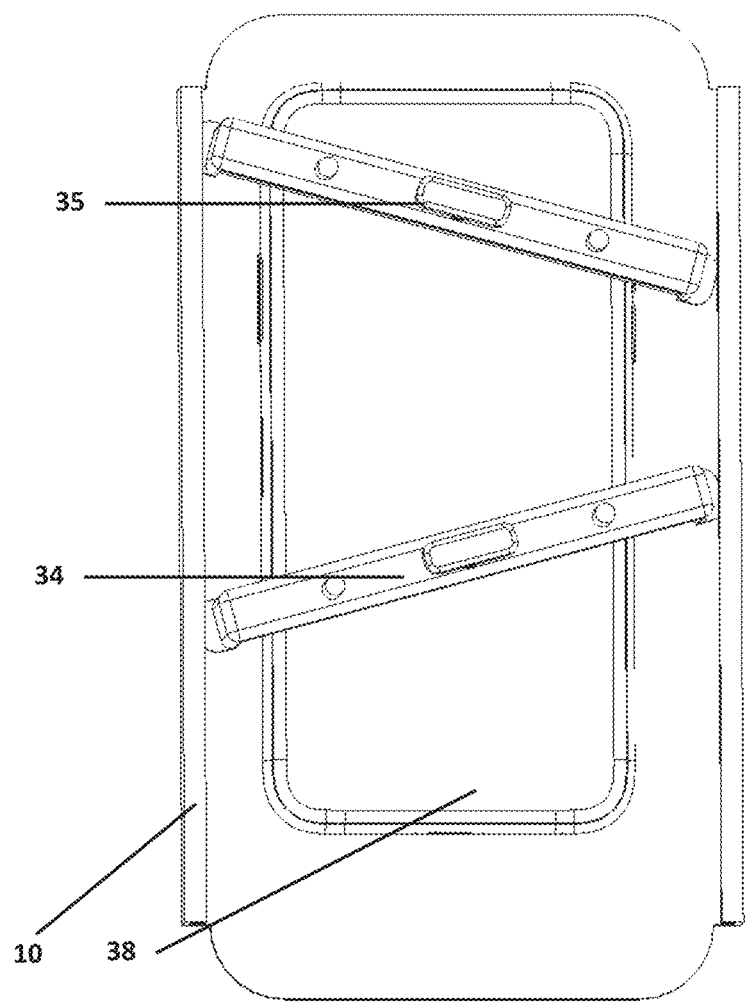
FIG. 3C is a top view showing the metal plate, the two adjustable lever systems and how the two adjustable lever systems are inserted on the metal plate and a mobile phone which is being pressed on to the metal plate by the two adjustable lever systems.
Figure 3D:
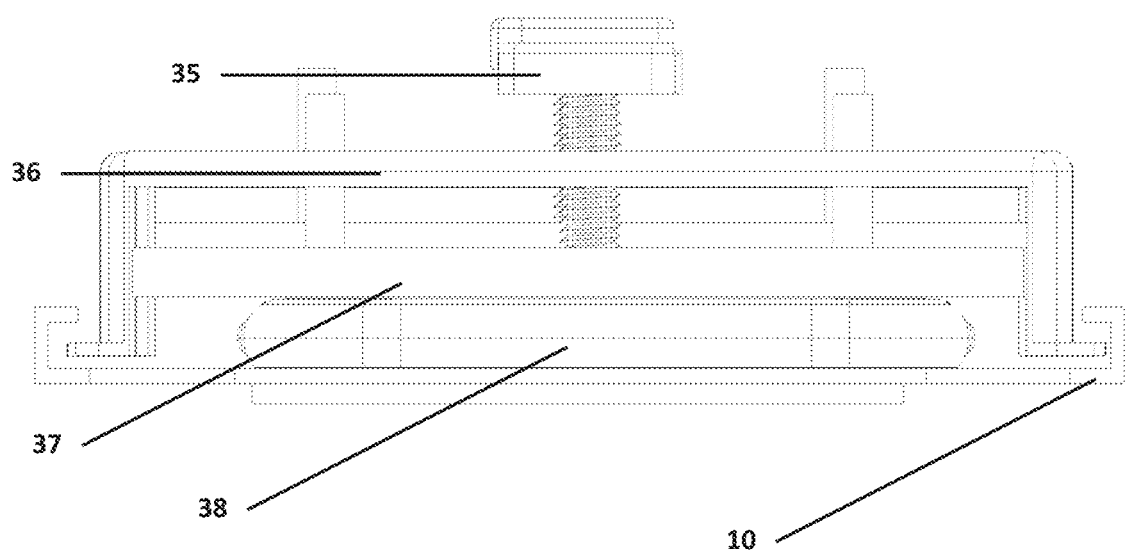
FIG. 3D is a side view showing the metal plate, two adjustable lever systems and how the two adjustable lever systems are inserted on the metal plate and a mobile phone which is being pressed on to the metal plate by the two adjustable lever systems.

Turning now to FIGS. 3A-3D the top housing panel 6, the freezing chamber 31, the metal plate 10, the antenna 22 and the two adjustable lever systems 34 are shown. FIG. 3D clearly shows how the two adjustable lever systems are comprised of 3 parts, namely the adjustable lever screw 35, the main lever housing 36 and the adjustable press down panel 37. As shown in FIGS. 3A-3D the main lever housing 36 slides within the left and right grooves of the metal plate 10 and is also held down by such grooves. The mobile phone 38 is placed on the metal plate 10 and the two adjustable lever systems 34 are moved into position so that the adjustable press down panels 37 of each adjustable lever system 34 are above the top end and bottom end of the mobile phone 38. Thereafter the adjustable lever screw 35 is turned in a clockwise direction resulting in the adjustable press down panels 37 being pushed downwards onto the mobile phone slowly applying pressure so that the mobile phone is firmly pressed against the metal plate 10 so as to maximize contact between the mobile phone 38 and the metal plate 10 lessening the freezing period, ensuring uniform freezing and also to maximize the freezing efficiency.

Reference has been made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A system for freezing components/parts of electronic mobile devices, comprising:
  a housing, said housing containing:
    an engine;
    an adjustable metal cooling head ring fixture affixed on to a cylindrical cooling head of the engine;
    a metal plate attached to the adjustable metal cooling head ring fixture so that sub-zero Celsius temperatures of the cylindrical cooling head of the engine are transferred to the adjustable metal cooling head ring fixture and to the metal plate resulting in the metal plate reaching sub-zero Celsius temperatures and operating as a base upon which the electronic mobile device components/parts are placed in order to be frozen;
    an encapsulation chamber for encapsulating the cylindrical cooling head of the engine, the adjustable metal cooling head ring fixture and the metal plate for temperature and air insulation purposes, for strength and vibration absorption purposes and also for forming a freezing chamber with the metal plate being the base of the freezing chamber;
    a push down lid for sealing the freezing chamber and also for pushing the electronic mobile device parts/components firmly down on a surface of the metal plate;
    a control printed circuit board with processor and software capable of controlling operation of the engine;
    a power inlet utilized to power the control printed circuit board and the engine; and
    an on/off switch for powering the system on and off.

2. The system of claim 1, further comprising an LCD (liquid crystal display) or OLED (organic light-emitting diode) display panel for displaying information regarding operation of the system and for operating the system.

3. The system of claim 1, further comprising four or more push down clips found on each corner of the push down lid and which allow the push down lid to close when pushed down, and when pushed down again to pop open.

4. The system of claim 3, further comprising the push down lid with four additional layers of expanded polypropylene, sponge polyurethane, polyurethane and expanded polypropylene for creating a sponge spring effect for the push down lock and unlock feature of the push down lid and also for applying downwards pressure on the electronic mobile device part for contact with a metal base of the freezing chamber.

5. The system of claim 1, further comprising the push down lid with four or more additional layers of expanded polypropylene, sponge polyurethane, polyurethane and expanded polypropylene for creating a sponge spring effect for applying downwards pressure on the electronic mobile device part for contact with a metal base of the freezing chamber.

6. The system of claim 1, further comprising an Ethernet inlet port, a Wi-Fi antenna, a WPS (Wi-Fi Protected Setup) switch and a communications printed circuit board with processor and operating system software for enabling two-way data and command transfer between the control printed circuit board and a central computer server via the Internet to enable remote system operation and system software updating via the central computer server.

7. The system of claim 6, further comprising a central computer server and a software application hosted and operated on the central computer server which connects via a two-way data transmission connection with the control printed circuit board using the communications printed circuit board and the Internet, facilitating real time, remote sending and receiving of operating instructions, freezing parameters including temperature and time, and data specific to a particular mobile device and/or mobile device component/part as well as facilitating remote system software updates as well as empowering a user of the system to operate the system via the software application hosted and operated on the central computer server and to obtain real time and historic operational data of the system.

8. The system of claim 1, further comprising a push operation button for making the system perform functions.

9. The system of claim 1, further comprising a secondary printed circuit board for controlling various functions of the engine, an internal power supply for supplying a varying range of voltage and amperage to the engine and a cooling fan for cooling the engine, all assembled together with the engine to form a single component.

10. The system of claim 9, further comprising a display panel for displaying information regarding the operation of the system as well as for operating the system.

11. The system of claim 10, further comprising four or more push down clips found on each corner of the push down lid and which allow the push down lid to close when pushed down, and when pushed down again to pop open.

12. The system of claim 11, further comprising the push down lid with four additional layers of expanded polypropylene, sponge polyurethane, polyurethane and expanded polypropylene for creating a sponge spring effect required for the push down lock and unlock feature of the push down lid and also for applying downwards pressure on the electronic mobile device part for contact with a metal base of the freezing chamber.

13. The system of claim 12, further comprising further comprising an Ethernet inlet port, a Wi-Fi antenna, a WPS switch and a communications printed circuit board for enabling two way data and command transfer between the control printed circuit board and a central computer server via the Internet to enable remote system operation and system software updating via the central computer server.

14. The system of claim 13, further comprising a central computer server and a software application hosted and operated on the central computer server which connects via a two-way data transmission connection with the control printed circuit board using the communications printed circuit board and the Internet, facilitating real time, remote sending and receiving of operating instructions, freezing parameters including temperature and time, and data specific to a particular mobile device and/or mobile device component/part as well as facilitating remote system software updates as well as empowering a user of the system to operate the system via the software application hosted and operated on the central computer server and to obtain real time and historic operational data of the system.

* * * * *